(12) United States Patent
Nishimura et al.

(10) Patent No.: US 8,370,050 B2
(45) Date of Patent: Feb. 5, 2013

(54) INSTANTANEOUS INTERRUPTION DETECTION APPARATUS AND INTERNAL COMBUSTION ENGINE CONTROL APPARATUS INCLUDING THE SAME

(75) Inventors: Mitsuhiro Nishimura, Chiryu (JP); Shinya Hoshi, Kariya (JP); Youhei Morimoto, Kariya (JP); Kazuhiro Higuchi, Ichinomiya (JP)

(73) Assignee: Denso Corporation, Kariya (JP)

( * ) Notice: Subject to any disclaimer, the term of this patent is extended or adjusted under 35 U.S.C. 154(b) by 479 days.

(21) Appl. No.: 12/796,881

(22) Filed: Jun. 9, 2010

(65) Prior Publication Data

US 2010/0312456 A1 Dec. 9, 2010

(30) Foreign Application Priority Data

Jun. 9, 2009 (JP) .................................. 2009-137857

(51) Int. Cl.
*F02M 7/28* (2006.01)
(52) U.S. Cl. ...................... 701/111; 123/435; 73/114.16
(58) Field of Classification Search .................. 123/435, 123/436; 701/103, 104, 105, 110, 111; 73/114.16, 73/114.17, 114.18
See application file for complete search history.

(56) References Cited

FOREIGN PATENT DOCUMENTS

| JP | 2001-056271 | 2/2001 |
|---|---|---|
| JP | 2010-285870 | * 12/2010 |

* cited by examiner

*Primary Examiner* — Hai Huynh
(74) *Attorney, Agent, or Firm* — Nixon & Vanderhye PC

(57) ABSTRACT

The instantaneous interruption detection apparatus includes a noise removing section to remove a noise component from an in-cylinder pressure signal inputted thereto, and output a noise-removed in-cylinder pressure signal, a derivative signal calculating section to calculate a detection signal which is a function of a derivative value of the noise-removed in-pressure signal with respect to the crank angle of an internal combustion engine, an instantaneous interruption determining section configured to make determination that instantaneous interruption of the in-cylinder pressure signal has occurred when the detection signal has exceeded a detection threshold, and a threshold setting section configured to set the detection threshold to such a value that the instantaneous interruption determining section can make the determination in accordance with the noise-removed in-pressure signal which is dull compared to the in-cylinder pressure signal inputted to the noise removing section depending on a gain-frequency characteristic of the noise removing section.

11 Claims, 11 Drawing Sheets

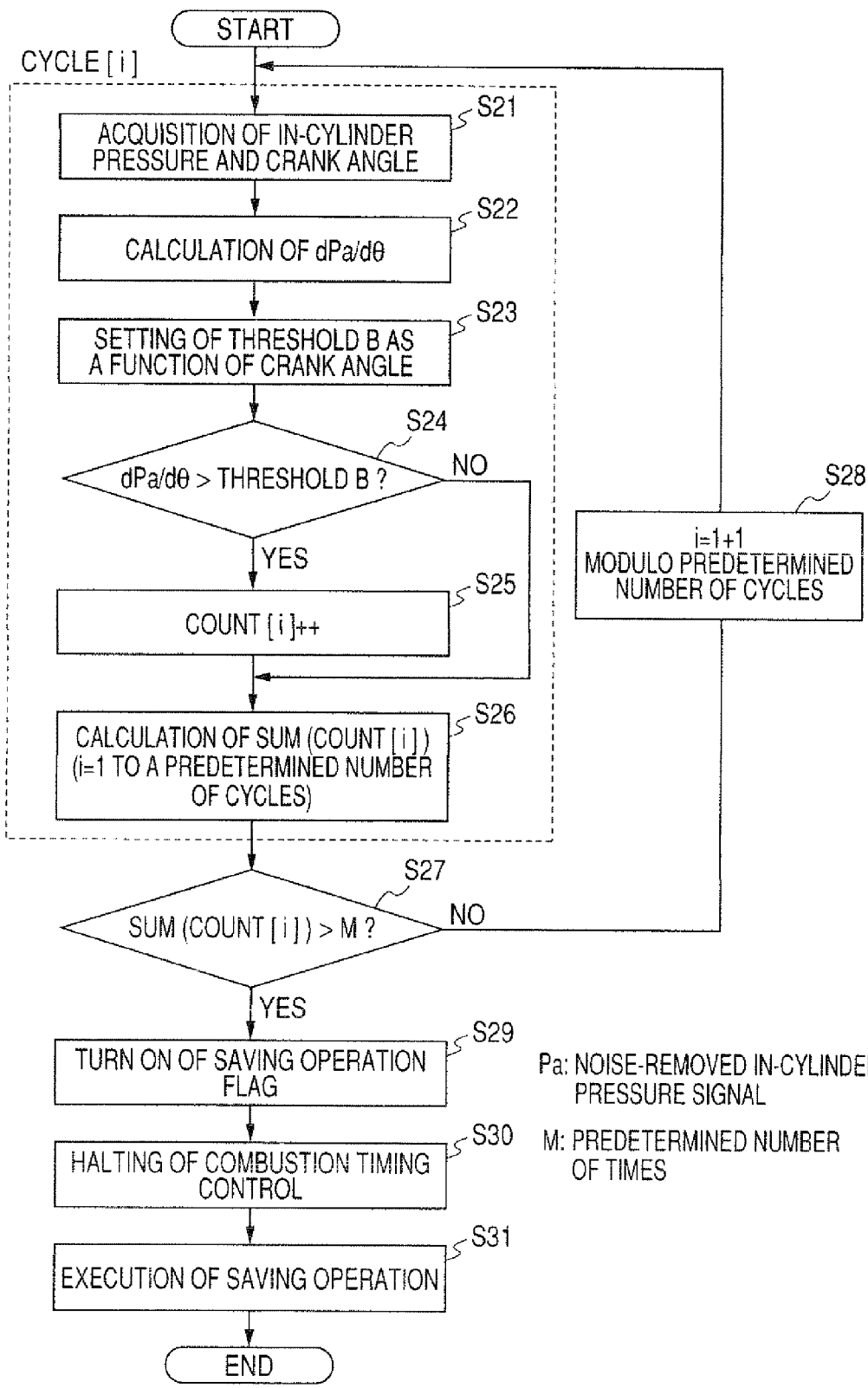

INSTANTANEOUS INTERRUPTION DETECTION APPARATUS AND INTERNAL COMBUSTION ENGINE CONTROL APPARATUS INCLUDING THE SAME

This application claims priority to Japanese Patent Application No. 2009-137857 filed on Jun. 9, 2009, the entire contents of which are hereby incorporated by reference.

BACKGROUND OF THE INVENTION

1. Field of the Invention

The present invention relates to an instantaneous interruption detection apparatus for detecting instantaneous interruption of a signal transmitted from an in-cylinder pressure sensor mounted on an internal combustion engine, and an internal combustion engine control apparatus including the instantaneous interruption detection apparatus.

2. Description of Related Art

Generally, an internal combustion engine having cylinders and a crank is provided with in-cylinder pressure sensors to measure the pressures inside the cylinders. The in-cylinder pressure sensors are connected to an ECU (Electronic Control Unit). This ECU controls the internal combustion engine by determining fuel injection timings, for example, in accordance with the in-cylinder pressure signals indicative of the in-cylinder pressures received from the in-cylinder pressure sensors. However, there may occur a case where transmission of the in-cylinder pressure signal from the in-cylinder sensor to the ECU is instantaneously interrupted due to corrosion or wear of a terminal provided for connection between the in-cylinder pressure sensor and the ECU (referred to as "instantaneous interruption" hereinafter). If such instantaneous interruption occurs, since the ECU is inputted with an incorrect in-cylinder pressure signal, and accordingly, improperly controls the internal combustion engine as a result of which harmful substance in exhaust gas is increased, the vehicle drivability is lowered, and the engine noise is increased.

Hence, it is strongly desired to develop an instantaneous interruption detection apparatus capable of detecting the instantaneous interruption of the in-cylinder pressure sensor. Meanwhile, Japanese Patent Application Laid-Open No. 2001-56271 describes a method of detecting noise superimposed on the in-cylinder pressure signal. It is possible to use this method to detect the instantaneous interruption of the in-cylinder pressure sensor as explained as follows. The in-cylinder pressure gradually changes with the change of the crank angle (the rotation angle of a crank of an internal combustion engine). Accordingly, since the derivative signal of the in-cylinder pressure signal is kept below a predetermined threshold as long as the instantaneous interruption does not occur, while if the instantaneous interruption occurs, it exceeds the predetermined threshold. Hence, by determining whether or not the derivative signal of the in-cylinder pressure signal exceeds the predetermined threshold, it is possible to determine occurrence of the instantaneous interruption.

Incidentally, in some cases, a noise eliminating means such as a filter circuit is provided between the in-cylinder pressure sensor and the ECU to remove the noise component from the in-cylinder pressure signal. In these cases, the ECU is inputted with the in-cylinder pressure signal from which the noise component has been removed (referred to as "noise-removed in-cylinder pressure signal" hereinafter). The waveform of the noise-removed in-cylinder pressure signal is dull compared to that of the in-cylinder pressure signal from which the noise component is not removed. Accordingly, it may occur that the deviation signal of the noise-removed in-cylinder pressure signal does not exceed the threshold even if the instantaneous interruption has occurred, because its value is smaller than that of the in-cylinder pressure signal from which the noise component is not removed by the noise eliminating means. As explained above, when the noise eliminating means is provided, there is a possibility that the instantaneous interruption of the in-cylinder pressure sensor cannot be detected, while on the other hand, when the noise eliminating means is not provided, the noise component cannot be removed from the in-cylinder pressure signal.

SUMMARY OF THE INVENTION

The present invention provides an instantaneous interruption detection apparatus for an in-cylinder pressure sensor mounted on a cylinder of an internal combustion engine to output an in-cylinder pressure signal indicative of an in-cylinder pressure of the cylinder, the instantaneous interruption detection apparatus comprising:

a noise removing section to remove a noise component from the in-cylinder pressure signal inputted thereto, and output a noise-removed in-cylinder pressure signal;

a crank angle sensor to detect a crank angle of a crank shaft of the internal combustion engine;

a derivative signal calculating section to calculate a detection signal which is a function of a derivative value of the noise-removed in-pressure signal with respect to the crank angle;

an instantaneous interruption determining section configured to make determination that instantaneous interruption of the in-cylinder pressure signal transmitted from the in-cylinder pressure sensor has occurred when the detection signal has exceeded a detection threshold; and a threshold setting section configured to set the detection threshold to such a value that the instantaneous interruption determining section can make the determination in accordance with the noise-removed in-pressure signal which is dull compared to the in-cylinder pressure signal inputted to the noise removing section depending on a gain-frequency characteristic of the noise removing section.

The present invention also provides an internal combustion engine control apparatus comprising:

an instantaneous interruption detection apparatus as recited above;

a combustion timing control section to perform combustion timing control in which, when ignition timing is at a first crank rotation angle of a crank shaft of the internal combustion engine at which a heat generation rate of a cylinder of the internal combustion engine is at a first predetermined value, controls fuel injection timing such that the ignition timing is at a second crank rotation angle of the crank shaft at which the heat generation rate is at a second predetermined value; and a halting section to halt the combustion timing control by the combustion timing control section when the instantaneous interruption detection apparatus detects the instantaneous interruption.

According to the present invention, there is provided an instantaneous interruption detection apparatus capable of reliably detecting occurrence of the instantaneous interruption of the in-cylinder pressure signal transmitted from an in-cylinder pressure sensor through a noise-removing section, and an internal combustion engine control apparatus for controlling an internal combustion engine by use of such an instantaneous interruption detection apparatus.

Other advantages and features of the invention will become apparent from the following description including the drawings and claims.

BRIEF DESCRIPTION OF THE DRAWINGS

In the accompanying drawings:

FIG. 12 is a flowchart showing the process for making a determination of occurrence of the instantaneous interruption, and switching between the combustion timing control and a saving operation in accordance with the result of the determination, which the internal combustion engine control apparatus performs;

PREFERRED EMBODIMENTS OF THE INVENTION

First Embodiment

Figure 1:
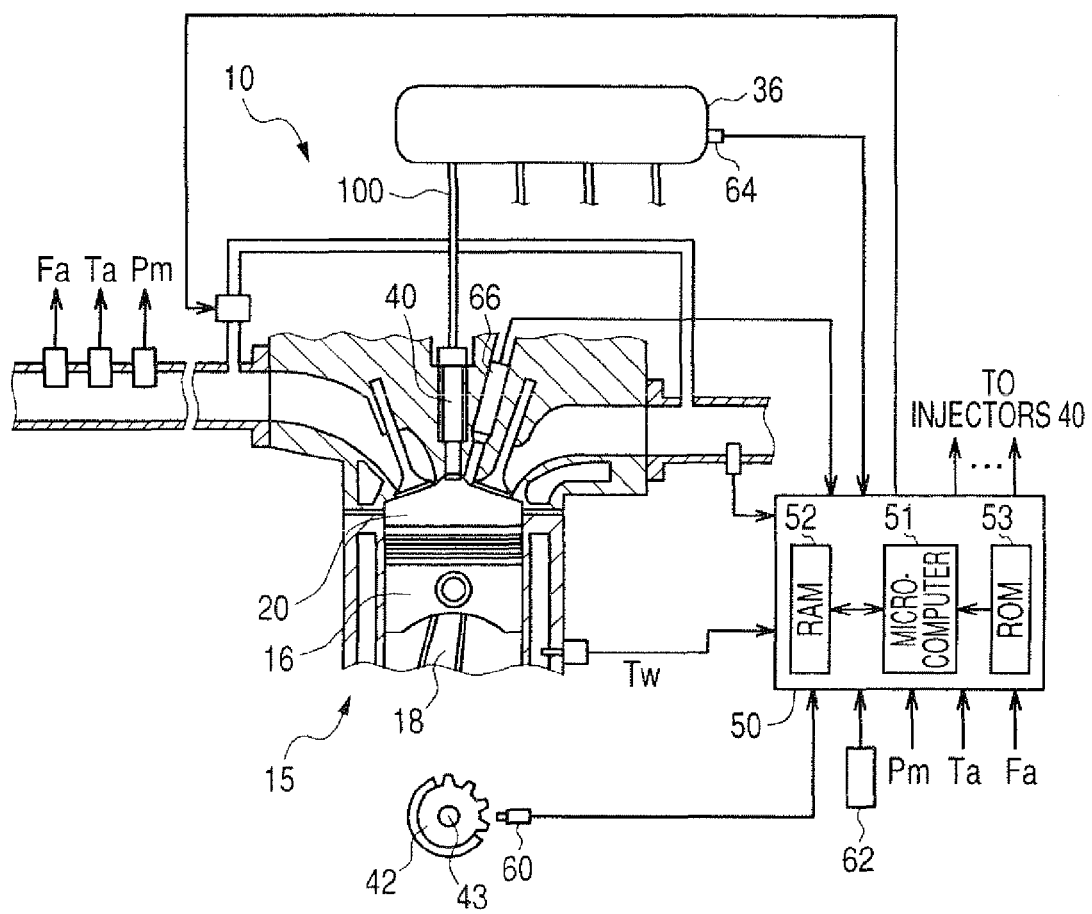
FIG. 1 is a diagram showing a schematic structure of an internal combustion engine 10 provided with an internal combustion engine control apparatus according to a first embodiment of the embodiment.

First, the schematic structure of an engine system including an internal combustion engine 10 controlled by an internal combustion engine control apparatus according to a first embodiment of the invention is explained with reference to FIG. 1. The engine 10 of the engine system is a multi-cylinder engine (a 4-stroke reciprocating diesel engine in this embodiment) mounted on a 4-wheel automatic transmission vehicle, for example. In FIG. 1, only one of the four cylinders #1 to #4 is shown as a cylinder 15 for the sake of expediency. The engine 10 repeatedly carries out a combustion cycle including intake, compression, combustion and exhaust processes for each of the cylinders #1 to 44. In more detail, the combustion cycle of a period of 720 degree CA is carried out in an interval of 180 degree CA in the order of the cylinders #1, #3, #4 and #2, while distinguishing among them by use of a cylinder-distinguishing sensor (electromagnetic pickup) mounted on a camshaft (not shown) of inlet valves 2 and exhaust valves 3. The structures of the cylinders #1 to #4 are basically the same. Accordingly, here, the engine system is explained with respect to the cylinder 15 which is one of the cylinders #1 to #4.

The engine system in which a crank shaft 43 of the engine 10 as an output shaft is rotated by the torque generated through combustion in the cylinder 15 is controlled by means of the ECU 50 and various sensors. Each of the components constituting the engine system including the engine 10 is explained in the followings.

The cylinder 15 houses a piston 16. The crank shaft 43 of the engine 10 is rotated by the reciprocating motion of the piston 16. The crank shaft 43 is provided with a pulser 43 which rotates together with the crank shaft 43. The pulser 42 is formed with a plurality of teeth at its outer periphery. Around the outer periphery of the pulser 42, there is disposed a crank angle sensor 60 (electromagnetic pickup, for example) which generates a crank angle signal indicative of an angular position of a crank 18 as a crank angle $\theta$ by detecting the teeth formed in the pulsar 42. The number and interval of the teeth formed in the pulser 42 are determined so that the crank angle signal is outputted from the crank angle sensor 60 at intervals of 1 degree CA, for example. Above the pulser 42, there are disposed teeth for detecting the top dead center TDC. The crank angle sensor 60 generates a top dead center signal indicative of the piston being at the top dead center position by detecting the teeth.

The engine system adopts an in-cylinder injection system to supply fuel to a combustion chamber 20. In more detail, the combustion chamber 20 of the cylinder 15 is provided with an injector 40 as an electromagnetic driven fuel injection valve which directly inject-supplies high pressure fuel (light oil pressurized over 1000 atmospheric pressure, for example) into a combustion chamber 20 from a common rail (pressure accumulating pipe) 36. The pressure of the high pressure fuel is controlled on the basis of the output signal of a common rail pressure sensor 64 which measures the pressure inside the common rail 36. The injector 40 is driven so that each of the cylinders of the engine 10 is supplied with a required amount of fuel. In more detail, while the engine 10 runs, intake air is supplied into the combustion chamber 20 of the cylinder 15 through the inlet pipe by opening operation of the inlet valve, the introduced air is mixed with fuel inject-supplied from the injector 40, and the mixture of fuel and air is compressed by the piston 16 to self-ignite and be combusted, and the exhaust gas is discharged to the exhaust pipe by opening operation of the exhaust valve.

The combustion chamber 20 is also provided with an in-cylinder pressure sensor 66 integrally with a glow plug as an ignition assisting means (to be more exact, fixed to the cylinder head). The in-cylinder pressure sensor 66 measures the pressure inside the cylinder 15 at its sensing portion (distal end portion of the probe of the in-cylinder pressure sensor 66 inserted into the combustion chamber 20). By the provision of the in-cylinder pressure sensor 66, it becomes possible to keep track of the combustion state of the cylinder 15, enabling to estimate the ignition timing and combustion temperature, and to detect knocking, the peak position of the combustion pressure, misfire, etc. The in-cylinder pressure sensor 66 outputs an in-cylinder pressure signal P indicative of the in-cylinder pressure (the pressure inside the cylinder 15) to the ECU 50. Like the above described injector 40, the in-cylinder pressure sensor 66 is provided in the combustion chamber of each of the four cylinders of the engine 10.

The vehicle on which the engine 10 is mounted (a 4-wheel passenger car or a truck, for example) is provided with various sensors other than the above mentioned sensors in order to perform vehicle control. For example, the accelerator pedal of the vehicle is provided with an accelerator sensor 62 which outputs an electrical signal indicative of the pressed amount of the accelerator pedal to detect the vehicle driver's operation amount (pressing amount) of the accelerator pedal.

The ECU 50 includes a microcomputer 51, a RAM 52 and a ROM 53. The microcomputer 51 keeps track of the running state of the engine 10 and the vehicle driver's demand in accordance with the output signals from the above various sensors using the RAM 52 or ROM 5, and operates various actuators including the injector 40 in order to optimally control the engine 10 depending on the state of the engine 10 at every moment. For example, when the engine 10 is running normally, the microcomputer 51 calculates various combustion conditions (injection timing, fuel injection amount, for example), and operates various actuators in accordance with the calculated results in order to control the indicated torque (generated torque) generated through fuel combustion in each of the cylinders, and also the shaft torque (output torque) actually outputted to the output shaft (crank shaft 43).

Figure 2:
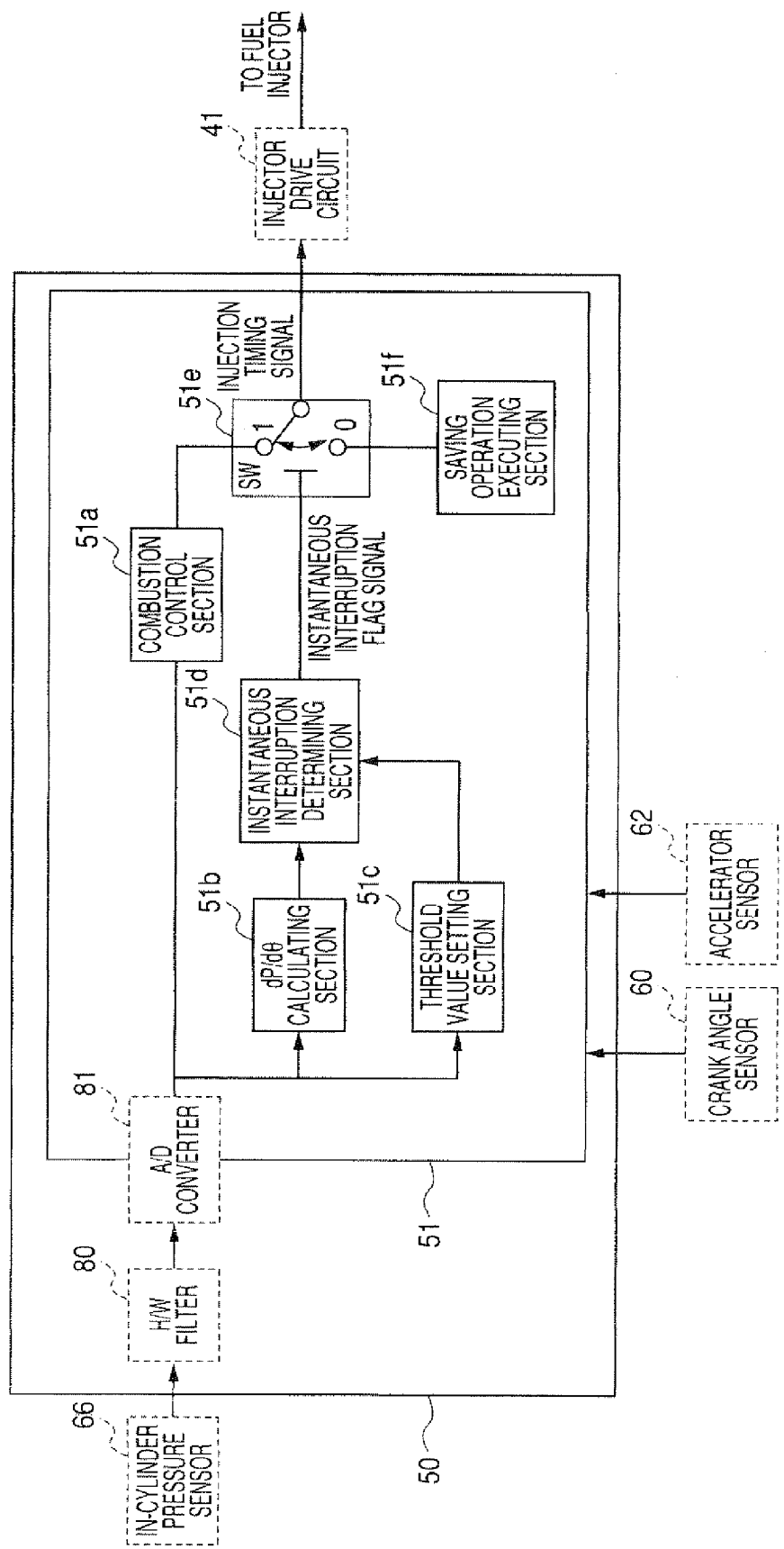
FIG. 2 is a diagram showing the internal structure of an ECU 50 constituting the internal combustion engine control apparatus, and a functional block diagram of a microcomputer 51 included in the ECU 50.

Next, the ECU 50 is explained in further detail with reference to FIG. 2. FIG. 2 is a diagram showing the internal structure of the ECU 50 constituting the internal combustion engine control apparatus, and a functional block diagram of the microcomputer 51 included in the ECU 50. As shown in FIG. 2, the ECU 50 includes, other than the microcomputer 51, RAM 52 and ROM 53, a H/W (hardware) filter 80 and an A/D converter 81. The H/W filter 80 is for eliminating a specific frequency component contained in the signal inputted thereto. Accordingly, it is possible to remove noise from the in-cylinder pressure signal P by passing it through the H/W filter 80. Instead of using the H/W filter 80, the noise may be removed by use of a circuit which smoothes the signal inputted thereto.

The in-cylinder pressure signal Pa from which noise has been removed by the H/W filter 80 (referred to as "noise-removed in-cylinder pressure signal Pa" hereinafter) is converted into a digital signal by the A/D converter 81, and then inputted to the microcomputer 51.

Figure 3:
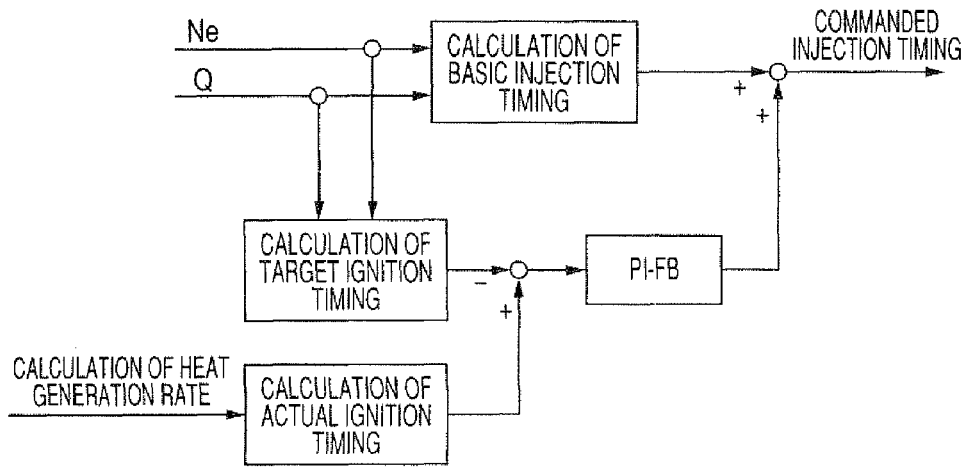
FIG. 3 is a conceptual diagram explaining the combustion timing control performed by the internal combustion engine control apparatus.
Figure 4:
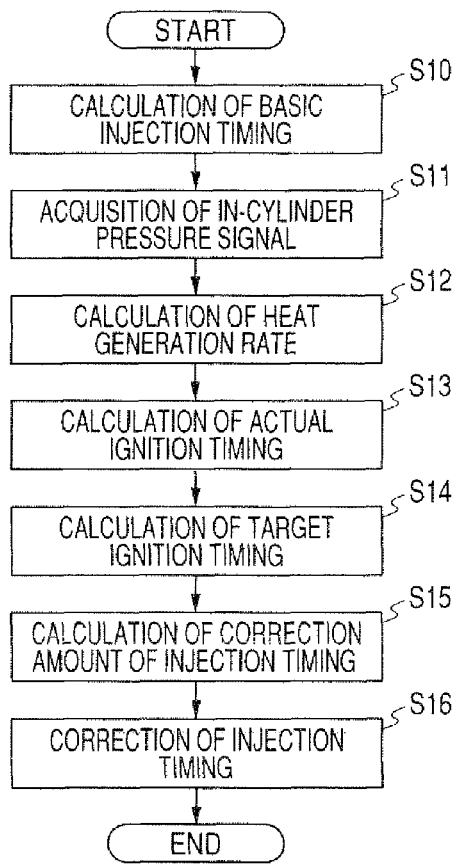
FIG. 4 is a flowchart showing the process of the combustion timing control.

As shown in FIG. 2, the microcomputer 51 is functionally constituted of a combustion control section 51a, a derivative signal calculating section 51b, a threshold setting section 51c, an instantaneous interruption determining section 51d, a control switching section 51e and a saving operation executing section 51f. The digital noise-removed in-cylinder pressure signal Pa is sent to the combustion control section 51a. The combustion control section 51a executes combustion timing control to control the ignition timing of injected fuel in accordance with the digital noise-removed in-cylinder pressure signal Pa. FIG. 3 is a conceptual diagram explaining the combustion timing control, and FIG. 4 is a flowchart showing the process of the combustion timing control. Next, the combustion timing control executed by the combustion control section 51a is explained with reference to FIGS. 3 and 4. The process shown in FIG. 4 is repeatedly executed at constant time intervals.

The process begins by calculating at step S10 a basic injection timing in accordance with the running state of the engine 10 including the engine rotational speed NE, fuel injection amount Q. The basic injection timing can be determined by referring to a map stored in the ROM 53, the map showing fuel injection timings as basic fuel injection timings appropriately determined in advance for various running states of the engine 10 depending on the engine rotational speed NE, fuel injection amount Q, etc. The engine rotational speed NE can be calculated from the output signal of the crank angle sensor 60, and the fuel injection amount Q may be a commanded injection amount determined in accordance with the demanded torque shown by the output signal of the accelerator sensor 62.

Figure 5:
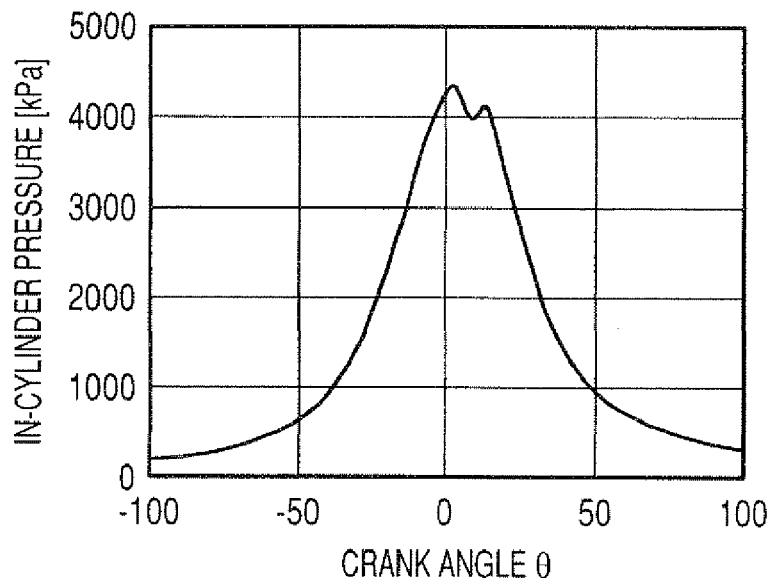
FIG. 5 is a diagram showing a waveform of an in-cylinder pressure signal when no instantaneous interruption occurs.

Meanwhile, there may be a case where combustion is not performed as intended although fuel is injected in accordance with the calculated basic injection timing, depending on environmental conditions. Accordingly, at next step S11, the noise-removed in-cylinder pressure signal Pa is acquired for each value of the crank angle θ. FIG. 5 is a diagram showing the waveform of the noise-removed in-cylinder pressure signal Pa with respect to the crank angle θ. In FIG. 5, the crank angle θ is 0 at the top dead center TDC. As shown in FIG. 5, the noise-removed in-cylinder pressure signal Pa is at its maximum in the vicinity of the top dead center TDC where the volume of the combustion chamber 20 is at its minimum.

At step S12 following step S11, a heat generation ratio dQ/de per unit angle of the crank angle θ is calculated for each value of the crank angle θ in accordance with the following equation (1).

$$\frac{dQ}{d\theta} = \frac{1}{\kappa - 1}\left(\kappa P \frac{dV}{d\theta} + V \frac{dP}{d\theta}\right) \quad (1)$$

The equation (1) is shown in many documents (Japanese Patent No. 3331107, for example) and known as a reliable equation to calculate the heat generation rate dQ/dθ. In the equation (1), κ is specific heat ratio, dV/dθ is the rate of change of the volume V of the combustion chamber 20 per unit angle of the crank angle θ, dPa/dθ is a rate of change of the in-cylinder pressure P indicated by the noise-removed in-cylinder pressure signal Pa per unit angle of the crank angle θ (the in-cylinder pressure changer rate, or the derivative). The volume change rate dV/dθ can be calculated from the waveform of the volume V with respect to the crank angle θ stored in the ROM 53. The in-cylinder pressure change rate dPa/dθ can be calculated from the waveform of the noise-removed in-cylinder pressure signal Pa acquired at step S11. By substituting the in-cylinder pressure P, volume V, volume change rate dV/dθ and in-cylinder pressure change rate dPa/dθ into the equation (1), the heat generation rate dQ/dθ can be obtained.

Figure 6:
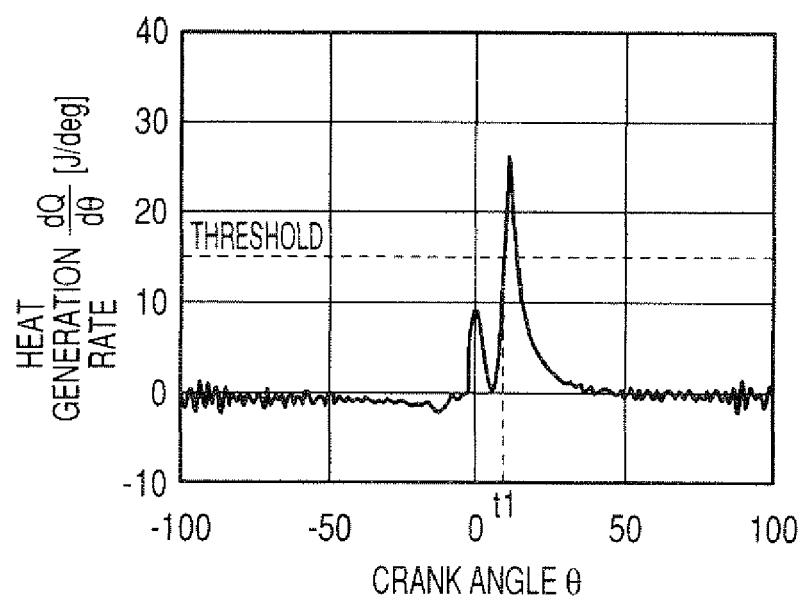
FIG. 6 is a diagram showing a heat generation ratio $dQ/d\theta$ of a cylinder of the engine 10 with respect to the crank angle $\theta$ of a crank shaft of the engine 10.

FIG. 6 shows the waveform of the heat generation rate dQ/dθ calculated at step S12. As seen from FIG. 6, the heat generation rate dQ/dθ sharply increases around the top dead center TDC. This is because fuel is injected and burned in the vicinity of the top dead center TDC.

Returning to the flowchart of FIG. 4, a specific value of crank angle θ at which the heat generation rate dQ/dθ reaches a predetermined threshold is calculated as an actual ignition timing t1 at step S13. It can be estimated to a certain extent in advance how injected fuel is burned on the basis of the engine rotational speed NE and commanded injection amount Q. It is possible to determine at what timing fuel should be injected to be burned optimally in accordance with the above estimation. Accordingly, at step S14, a target ignition timing t2 is calculated in accordance with engine rotational speed NE and the commanded injection amount Q. The target ignition timing t2 is determined in advance for each running state of the engine 10 depending on the engine rotational speed NE and commanded injection amount Q, and stored in the ROM 53.

At subsequent step S15, a correction amount of the basic injection timing is calculated on the basis of the actual ignition timing t1 and the target ignition timing t2. In this embodiment, the basic correction timing is corrected by PI control. Accordingly, the correction amount is calculated in accordance with a variation ERROR between the actual ignition timing t1 and the target ignition timing t2, and the integrated value of the variation ERROR. Alternatively, the correction amount may be calculated in accordance with the variation ERROR, its integrated value plus its derivative value (PID control). Thereafter, the basic injection timing is corrected in accordance with the calculated correction amount at step S16, and then this process is terminated.

Figure 7:
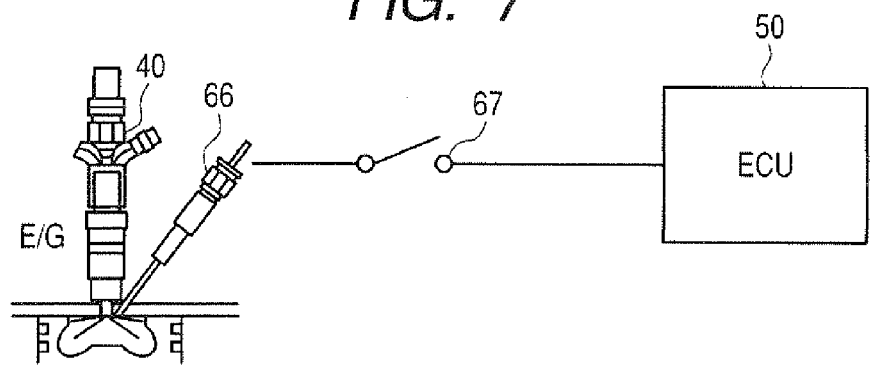
FIG. 7 is a diagram showing a terminal 67 provided for connection between an in-cylinder pressure sensor 66 and the ECU 50.

By controlling the combustion timing in the above way, it is possible to prevent knocking, reduce harmful substance in the exhaust gas, and increase fuel efficiency. Meanwhile, as shown in FIG. 7, the ECU 50 and the in-cylinder presser sensor 66 are connected at the terminal 67. There may occur a case in which the in-cylinder pressure signal P transmitted from the in-cylinder presser sensor 66 is instantaneously interrupted due to corrosion or wear of the terminal 67. If such instantaneous interruption occurs, the ECU 50 receives an incorrect in-cylinder pressure signal, and accordingly, the combustion control section 51a is inputted with an incorrect noise-removed in-cylinder pressure signal. Since the heat generation rate $dQ/d\theta$ is calculated in accordance with the noise-removed in-cylinder pressure signal Pa and its derivative signal $dPa/d\theta$, the heat generation rate $dQ/d\theta$ is incorrectly calculated when the instantaneous interruption occurs. As a result, since the actual ignition timing t2 determined in accordance with the heat generation rate $dQ/d\theta$ is also incorrect, if the timing of fuel injection is controlled in accordance with the incorrect actual ignition timing t2, it may occur that harmful substance in the exhaust gas increases, and the fuel efficiency decreases. Accordingly, upon detecting the instantaneous interruption of the in-cylinder pressure sensor 66, the microcomputer 51 halts the above combustion timing control, and performs a predetermined saving process. Next, a method for detecting the instantaneous interruption and the saving process are explained in detail.

Figure 8:
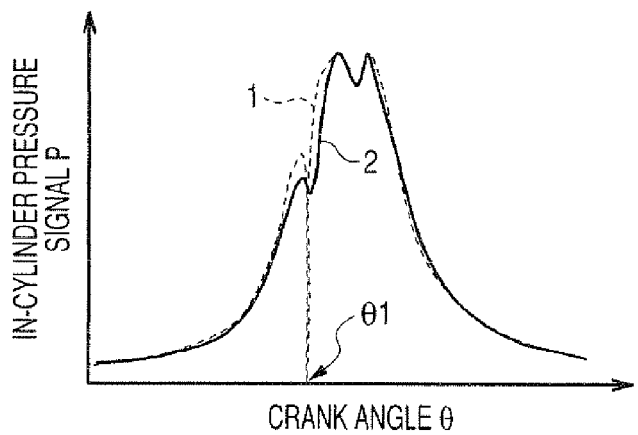
FIG. 8 is an explanatory diagram explaining dulling of the noise-removed in-cylinder pressure signal P due to use of a H/W filter 80.
Figure 9:
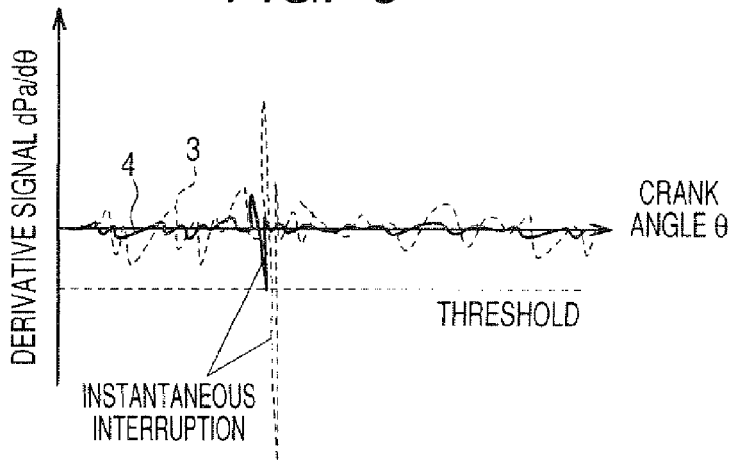
FIG. 9 is an explanatory diagram explaining decrease of the derivative signal $dPa/d\theta$ of the in-cylinder pressure signal P due to use of the H/W filter 80.

Functions to detect the instantaneous interruption and to execute saving operation are implemented by the derivative signal calculating section 51b, threshold setting section 51c, instantaneous interruption determining section 51d, control switching section 51e and saving operation executing section 51f shown in FIG. 2. FIG. 8 shows the waveform 1 (broken line) of the in-cylinder pressure signal P being inputted to the H/W filter 80, and the waveform 2 (solid line) of the noise-removed in-cylinder pressure signal Pa being outputted from the H/W filter 80, when there occurs the instantaneous interruption at the crank angle of $\theta 1$. FIG. 9 shows a waveform 3 (broken line) of the derivative signal $dPa/d\theta$ of the waveform 1 shown in FIG. 8 with respect to the crank angle $\theta$, and a waveform 4 (solid line) of the derivative signal $dPa/d\theta$ of the waveform 2 shown in FIG. 8 with respect to the crank angle $\theta$. As shown in FIG. 8, normally, the in-cylinder pressure signal P gradually changes with the change of the crank angle $\theta$.

However, if there occurs the instantaneous interruption, the in-cylinder pressure signal P becomes 0 instantaneously, and accordingly, the in-cylinder pressure signal P changes sharply around the occurrence of the instantaneous interruption. Accordingly, as shown in FIG. 9, normally, the value of the derivative signal $dPa/d\theta$ of the in-cylinder pressure signal P is small. However, it becomes very large when the instantaneous interruption occurs. Therefore, it is possible to determine whether the instantaneous interruption has occurred by determining whether the derivative signal $dPa/d\theta$ of the in-cylinder pressure signal P has reached a predetermined threshold B.

However, actually, the in-pressure signal P is inputted to the microcomputer 51 after the noise components contained therein have been removed by the H/W filter 80 as the noise-removed in-cylinder pressure signal Pa. As seen from the waveform 2 of the noise-removed in-cylinder pressure signal Pa shown in FIG. 8, since the noise-removed in-cylinder pressure signal Pa becomes dull by the characteristic of the H/W filter 80, it drops only slightly when there occurs the instantaneous interruption. Accordingly, its derivative signal $dPa/d\theta$ (waveform 4) at the time of the occurrence of the instantaneous interruption is smaller than the derivative signal $dP/d\theta$ (waveform 3) of the in-pressure signal P being inputted to the H/W filter 80. Therefore, it is not possible to accurately determine occurrence of the instantaneous interruption by use of the threshold B having a value appropriate to the case where the H/W filter 80 is not provided. Accordingly, in this embodiment having the structure in which the derivative signal calculating section 51b calculates the derivative signal $dPa/d\theta$ of the noise-removed in-cylinder signal Pa, and the instantaneous interruption determining section 51d determines occurrence of the instantaneous interruption on the basis of the magnitude of this derivative signal $dPa/d\theta$, the threshold setting section 51c sets the value of the threshold B taking account of the characteristic of the H/W filter 80 which dulls the waveform of the noise-removed in-cylinder pressure signal Pa.

Next, the method of setting the value of the threshold B performed by the threshold setting section 51c is explained. In this embodiment, the waveform of the noise-removed in-cylinder pressure signal Pa outputted from the H/W filter 80 is calculated in advance by simulation for each of the case where the instantaneous interruption does not occur and the case where the instantaneous interruption occurs. The extent to which the in-cylinder pressure signal Pa drops is estimated in accordance with the simulation results, and the value of the threshold B is set in accordance with this estimation. The method is explained in further detail with reference to FIGS. 10A to 10B and FIG. 11.

Figure 10A:
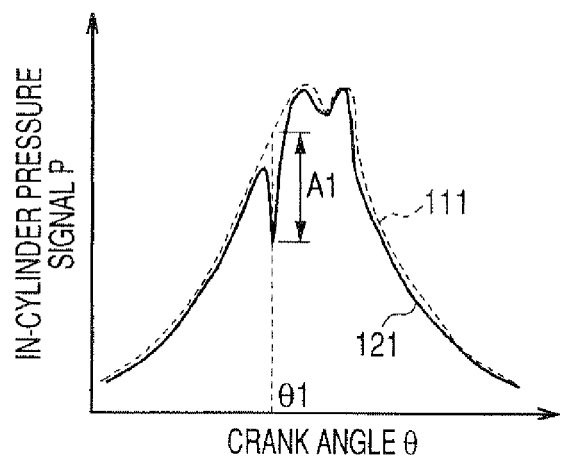
FIGS. 10A to 10C are explanatory diagrams explaining setting of a threshold B to detect the instantaneous interruption in the internal combustion engine control apparatus of the first embodiment.

FIG. 10A is a diagram showing the waveform 111 (broken line) of the noise-removed in-cylinder pressure signal Pa outputted from the H/W filter 80 when the instantaneous interruption does not occur calculated by simulation, and the waveform 121 (solid line) of the noise-removed in-cylinder pressure signal Pa outputted from the H/W filter 80 when the instantaneous interruption occurs when the crank angle $\theta$ is at $\theta 1$ calculated by simulation. As seen from the waveform 121 of the noise-removed in-cylinder pressure signal Pa shown in FIG. 10A, the in-cylinder pressure signal Pa drops when the crank angle $\theta$ is at $\theta 1$ at which the instantaneous interruption occurs. However, it does not drop as low as 0, because of the characteristic of the H/W filter 80. As shown in FIG. 10A, the difference A at the crank angle of $\theta 1$ between the noise-removed in-cylinder pressure signal Pa (waveform 111) when the instantaneous interruption does not occur and the noise-removed in-cylinder pressure signal Pa (waveform 121) when the instantaneous interruption occurs at the crank angle of θ1 is equal to A1.

Here, the value of the derivative signal dPa/dθ calculated from the waveform 121 when the crank angle θ is at θ1 is proportional to the value of A1 of the difference A.

Accordingly, the value of the threshold B can be determined on the basis of the value of A1 of the difference A. As explained above, the threshold B can be determined in accordance with the difference A between the waveform of the noise-removed in-cylinder pressure signal Pa when the instantaneous interruption does not occur and the waveform of the noise-removed in-cylinder pressure signal Pa when the instantaneous interruption occurs.

Figure 10B:
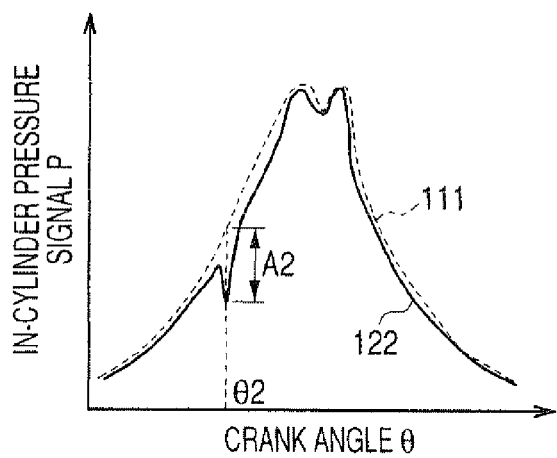

However, the value of the difference A depends on the value of the crank angle θ as explained below with reference to FIG. 10B. FIG. 10B is a diagram showing the waveform 111 (broken line) of the noise-removed in-cylinder pressure signal Pa calculated by simulation for the case where the instantaneous interruption does not occur, and the waveform 122 (solid line) of the noise-removed in-cylinder pressure signal Pa calculated by simulation for the case where the instantaneous interruption occurs when the crank angle θ is at θ2. The angle θ1 shown in FIG. 10A is closer to the top dead center TDC than the angle θ2 shown in FIG. 10B, and accordingly, the value of the nose-removed in-cylinder pressure signal Pa when the crank angle θ is at θ1 is larger than that when the crank angle θ is at θ2.

Figure 10C:
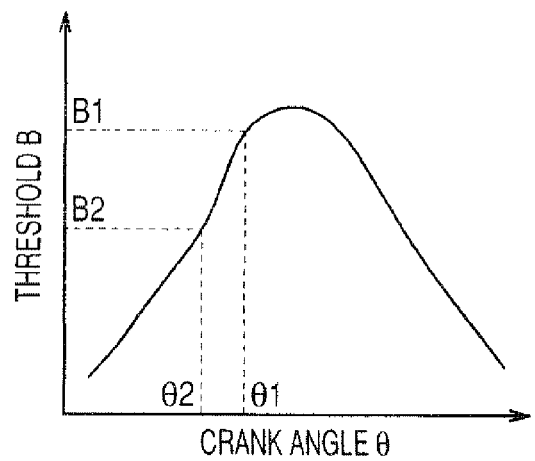

The value A2 of the difference between the waveform 111 and the waveform 112 when the crank angle θ is at θ2 shown in FIG. 10B is smaller than the difference value A1 shown in FIG. 10A. This is because, in the waveform 111 when the instantaneous interruption does not occur, the value of the noise-removed in-cylinder pressure signal Pa at the crank angle of θ1 is larger than that at the crank angle of θ2. Since as the value of the noise-removed in-cylinder pressure signal Pa immediately before occurrence of the instantaneous interruption increases, the value of the difference A and also the value of the derivative signal dPa/dθ increase, the threshold B has to be increased with the increase of the noise-removed in-cylinder pressure signal Pa. As shown in FIG. 10C, the threshold B can be set for each value of the crank angle θ such that it increases as the crank angle θ approaches the top dead center TDC.

Figure 11A:
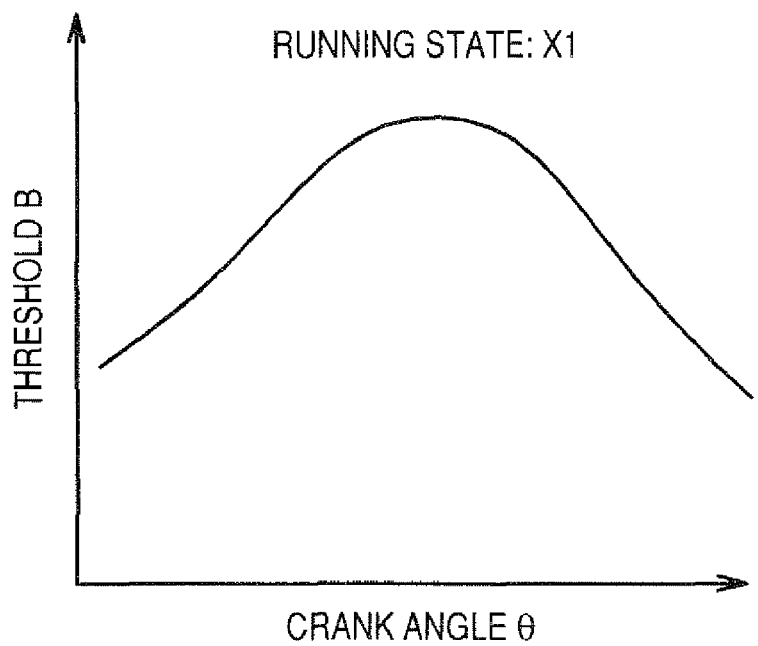
FIGS. 11A and 11B are diagrams showing a threshold map for each running state of the engine 10 used in the internal combustion engine control apparatus to detect the instantaneous interruption.
Figure 11B:
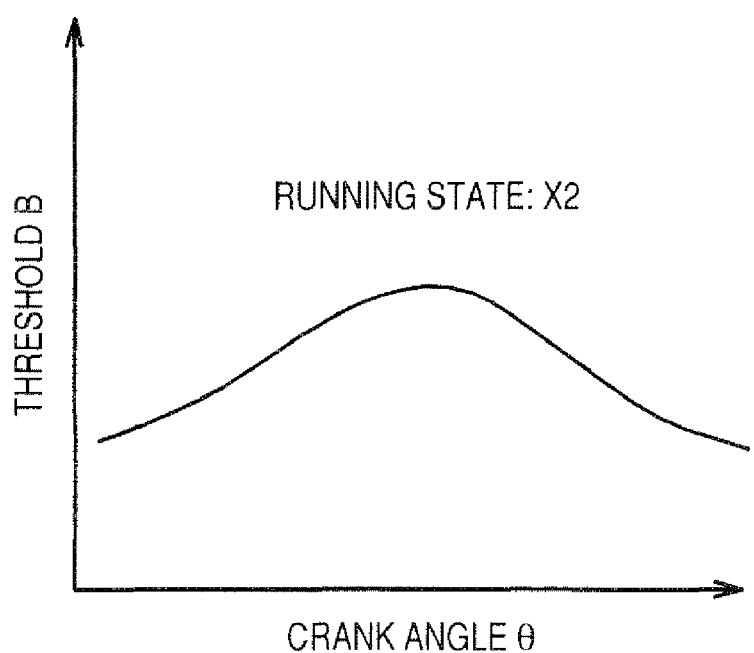

As explained above, although it is possible to set the threshold B for each value of the crank angle θ in advance by simulation, the value of the noise-removed in-cylinder pressure signal Pa depends on the running state of the engine 10 such as the engine rotational speed NE and commanded injection amount Q. Accordingly, in this embodiment, the simulation is performed for each different running state of the engine 10, and the value of the threshold B is determined for each different running state and for each value of the crank angle θ as shown in FIG. 11. The section (a) of FIG. 11 shows a threshold map showing the value of the threshold B for each value of the crank angle θ for a certain running condition X1, and the section (b) of FIG. 11 shows another threshold map showing the value of the threshold B for each value of the crank angle θ for a different running condition X2. The threshold maps for different running conditions are stored in the ROM 53 in advance. The threshold setting section 51c selects one of the threshold maps that matches the current running condition from the ROM 53, and reads a threshold value from the threshold value-crank angle curve of the selected threshold map at an angle position corresponding to the current crank angle θ as the value of the threshold B.

The instantaneous interruption determining section 51d determines occurrence of the instantaneous interruption with reference to the thus set threshold B. The saving operation executing section 51f is configured to halt the combustion timing control and instead, execute a predetermined saving operation when the instantaneous interruption is detected to have occurred. The content of the saving operation is explained later. The control switching section 51e maintains connection between the combustion control section 51a and an injector drive circuit 41 while the instantaneous detection is not detected, and breaks the connection therebetween, and instead, makes connection between the saving operation executing section 51f and the injector drive circuit 41.

The ECU 50 having the above described structure performs the process shown in the flowchart of FIG. 12 to detect occurrence of the instantaneous interruption, and switch between the combustion timing control and the saving operation depending on the detection result. The process of the flowchart of FIG. 12 is started concurrently with start of the engine 10. Before this process is started, the combustion control section 51a is executing the combustion timing control.

The process begins by acquiring the noise-removed in-cylinder signal Pa and the crank angle θ at step S21. Subsequently, the derivative signal calculating section 51b calculates the derivative signal dPa/dθ from the acquired noise-removed in-cylinder signal Pa and the crank angle θ at step S22. At subsequent step S23, the threshold setting section 51c identifies the current running state of the engine 10, reads out one of the threshold maps from the ROM 53 which corresponds to the running state, and sets the threshold B for the current value of the crank angle θ with reference to the threshold value-crank angle curve shown in this threshold map. In this embodiment, the running state of the engine 10 is identified by the engine rotational speed NE and a fuel injection amount. The engine rotational speed NE can be calculated from the output signal of the crank angle sensor 60. The fuel injection amount may be the commanded injection amount Q determined in accordance with the output signal of the accelerator sensor 62 indicative of the demanded torque.

Thereafter, the instantaneous interruption determining section 51d determines whether or not the derivative signal dPa/dθ is larger than the threshold B at step S24. If the determination result at step S24 is affirmative, a one-cycle reached times count COUNT [i] is incremented by 1, and stored in the RAM 52 at step S25. Here, the one-cycle reached times COUNT [i] represents the number of times that the threshold B is reached during the current engine cycle [i]. The term "engine cycle" means one engine cycle period including the four periods of the intake stroke, compression stroke, combustion stroke and exhaust stroke of the engine 10. The one-cycle reached times COUNT [i] is set to the initial value of 0 before the process is started. The RAM 52 also stores the values of the one-cycle reached times COUNT [k] of the previous engine cycles [k] (k=1, 2, . . . N; N being a positive integer) obtained by the process of this flowchart previously performed. On the other hand, if the determination result at step S24 is negative, step S25 is skipped to maintain the one-cycle reached times count COUNT [i] unchanged.

At step S26 following step 925, the instantaneous interruption determining section 51d calculates, as a threshold-reached times SUM, the sum of the one-cycle reached times COUNT [i] of the current engine cycle [i] and the one-cycle reached times COUNT [k] of the previous engine cycles [k] (k=1, 2, . . . N) which are k cycles before the current engine cycle [i].

Figure 13:
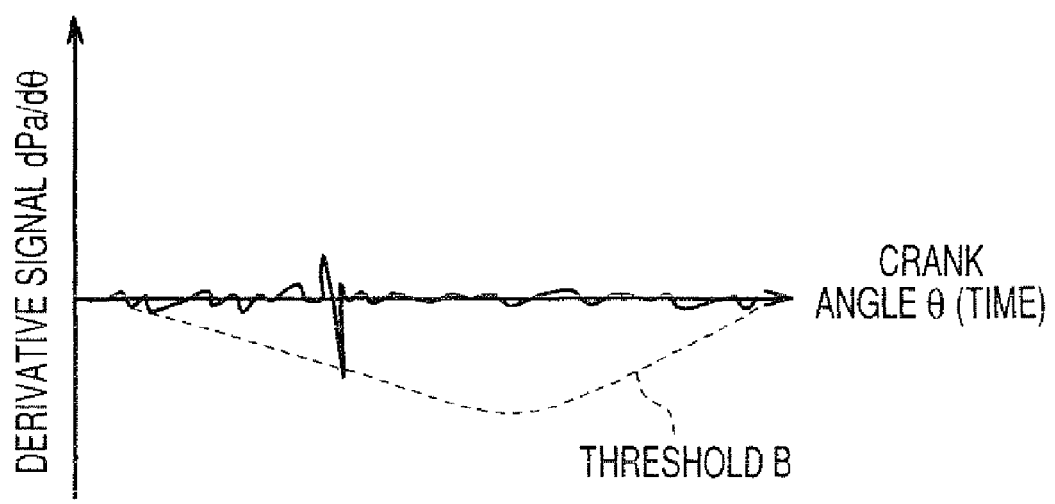
FIG. 13 is an explanatory diagram explaining setting of the threshold value B for each different value of the derivative signal $dPa/d\theta$.

The above steps S21 to S26 continued to be performed until the current engine cycle [i] is completed. That is, the threshold vale B is set for each value of the crank angle θ. FIG. 13 is a diagram showing the waveform of the derivative signal dPa/dθ and the value of the threshold B set for each value of the crank angle θ. The threshold B is set taking account of the value of the derivative signal dPa/dθ when the instantaneous interruption has occurred. Each time the derivative signal dPa/dθ is detected to be larger than the threshold B, the one-cycle reached times count COUNT [i] is incremented by 1.

At step S27 following step S26, the instantaneous interruption determining section 51d determines whether or not the threshold-reached times SUM is larger than a predetermined number M to determine whether or not the instantaneous interruption has occurred. If the determination result at step S27 is negative, the process proceeds to step S28 to increment the current engine cycle number i by one assuming that the instantaneous interruption has not occurred, and then returns to step S21 in order to count the one-cycle reached times COUNT [i] in the next engine cycle. Thereafter, at step S26, the threshold reached times SUM from the next engine cycle [i] to the previous engine cycles [i–N] which are N cycles before this next engine cycle [i] is calculated. At step S27 following step S26, it is determined whether or not the instantaneous interruption has occurred on the basis of the threshold reached times SUM.

As explained above, in this embodiment, the one-cycle reached times COUNT [k] is counted for each of the engine cycles [k, k=1 to N], and it is determined whether or not the instantaneous interruption has occurred in accordance with the threshold reached times SUM of the current engine cycle [i] and a predetermined number (N in this embodiment) of previous engine cycles. In this embodiment, the one-cycle reached times COUNT of the engine cycles older by more than N engine cycles than the current engine cycle [i] are discarded in order to prevent the amount of data stored in the RAM 52 from increasing without limitation.

If the determination result at step S27 is affirmative, the process proceeds to step S29 to set a saving operation flag F stored in the RAM 52 to 1 to cause the saving operation executing section 51f to execute the saving operation assuming that the instantaneous interruption has occurred. As a result, the control switching section 51e breaks the connection between the combustion control section 51a and the injector drive circuit 41 to halt the combustion timing control by the control combustion control section 51a, and makes connection between the saving operation executing section 51f and the injector drive circuit 41 at step S30.

Subsequently, the saving operation executing section 51f executes the saving operation in which fuel is injected in accordance with a basic injection timing depending on the running state of the engine 10. The basic injection timing, which is the same as the foregoing basic injection timing used in the combustion timing control (step S10 shown in FIG. 5), is determined in advance for each different engine running state depending on the engine rotational speed NE and commanded injection amount Q, and stored in the ROM 53 as a basic injection map. In short, the saving operation is an operation to inject fuel in accordance with the basic fuel injection timing which is the same as the basic fuel injection timing used in the combustion timing control, but without being corrected. The reason why the saving operation is executed is that correction of the basic injection timing can be made correctly only when the noise-removed in-cylinder pressure signal Pa is correct, and accordingly if the basic injection timing is corrected when the instantaneous interruption has occurred making the noise-removed in-cylinder pressure signal Pa incorrect, there may occur unfavorable results such as engine knocking, increase of harmful substance contained in the exhaust gas and decrease of fuel efficiency. Accordingly, by executing the saving operation, it becomes possible to prevent engine knocking, increase of harmful substance in the exhaust gas and decrease of fuel efficiency, although it may not be possible to optimally control the combustion timing of the engine. When step S31 is completed, the process of the flowchart shown in FIG. 12 is terminated.

As explained above, in this embodiment, the waveforms of the noise-removed in-cylinder pressure signal Pa outputted from the H/W filter 80 when the instantaneous interruption does not occur and when the instantaneous interruption has occurred are calculated in advance by simulation. The value of the threshold B is determined for each value of the crank angle θ, and is stored in the ROM 53 as the threshold map. To make a determination of occurrence of the instantaneous interruption, the value of the threshold B corresponding to the value of the crank angle θ at the time is read from the threshold map, and is set as the threshold to make the determination. The threshold map is stored in the ROM for each of different running states of the engine 10. Accordingly, it is possible to make a determination of occurrence of the instantaneous interruption accurately irrespective of the engine running state.

In this embodiment, determination of occurrence of the instantaneous interruption is made on the basis of the threshold reached times SUM of the current engine cycle [i] and the N previous engine cycles. This makes it possible to prevent erroneously determining that the instantaneous interruption has occurred when the noise-removed in-cylinder pressure Pa is overlapped with noise, causing the derivative signal dPa/dθ to increase.

Further, since the saving operation is executed when the instantaneous interruption is detected, it is possible to prevent engine knocking, increase of harmful substance in the exhaust gas and decrease of fuel efficiency, which would occur if the combustion timing control is performed in accordance with the incorrect noise-removed in-cylinder pressure Pa.

Second Embodiment

Next, an internal combustion engine control apparatus including an instantaneous interruption detection apparatus according to a second embodiment of the invention is described. In the foregoing first embodiment, the threshold B to detect the instantaneous interruption is determined in advance and stored in the ROM 53. In the second embodiment, the threshold B is calculated in real time when the engine 10 runs, and used to detect the instantaneous interruption. The following description focuses on the difference with the first embodiments.

Figure 14A:
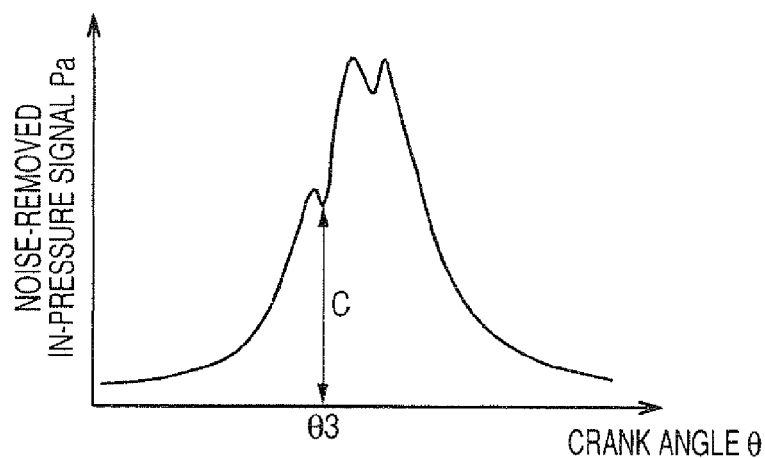
FIGS. 14A, 14B and 14C are explanatory diagrams explaining setting of the threshold value B in an internal combustion engine control apparatus according to a second embodiment of the invention.
Figure 14B:
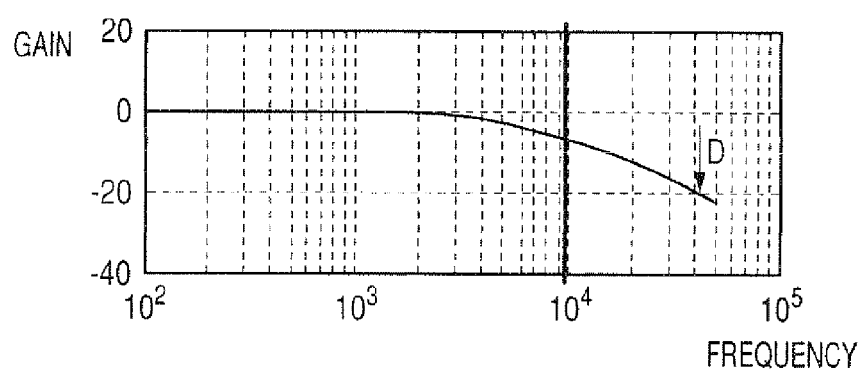
Figure 14C:
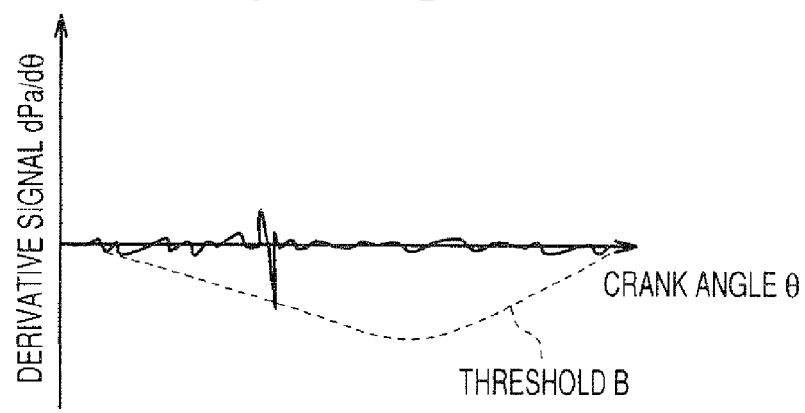

First, the method used in this embodiment to set the threshold B is explained. FIG. 14A is a diagram showing the waveform of the noise-removed in-cylinder pressure signal Pa when the instantaneous interruption has occurred at the crank angle of θ3. FIG. 14B is a diagram showing the gain-frequency characteristic of the H/W filter 80. FIG. 14C is a diagram showing the waveform of the derivative signal dPa/dθ of the noise-removed in-cylinder pressure signal Pa shown in FIG. 14A.

As shown in FIG. 14A, the in-cylinder pressure signal Pa drops at the crank angle of θ3 at which the instantaneous interruption has occurred. However, it does not drop as low as 0, because of the characteristic of the H/W filter 80. As shown in FIG. 14C, the derivative signal dPa/dθ of the in-cylinder pressure signal Pa has a large value at the crank angle of θ3.

The value of the derivative signal $dPa/d\theta$ at the crank angle of $\theta 3$ increases with the increase of the value C of the noise-removed in-cylinder pressure signal Pa. On the other hand, the derivative signal $dPa/d\theta$ becomes smaller as the gain D of the H/W filter 80 becomes larger to make the in-cylinder pressure signal Pa more dull.

Accordingly, by setting the threshold B such that it becomes larger as the value C of the noise-removed in-cylinder pressure signal Pa at the crank angle of $\theta 3$ becomes larger, and becomes smaller as the gain D of the H/W filter 80 becomes larger, it is possible to determine the threshold B optimally with respect to the H/W filter 80 and each value of the crank angle $\theta$. The gain D is specific to the H/W filter 80, and the value of threshold B increases as the value of the noise-removed in-cylinder pressure signal Pa increases. Hence, the waveform of the threshold B in the second embodiment is the same as that in the first embodiment. In the second embodiment, the threshold value B is calculated and set taking account of the above. Next, the structure and operation of the second embodiment is explained.

The structure of the internal combustion engine control apparatus of the second embodiment is the same as that of the first embodiment shown in FIG. 1. Also, the internal structure of the ECU 50 and the functional blocks of the microcomputer 51 in the second embodiment are the same as those in the first embodiment shown in FIG. 2. However, in the second embodiment, the ROM 53 of the ECU 50 does not store the threshold maps, but instead, stores the gain-frequency characteristic of the H/W filter 80. The gain-frequency characteristic of the H/W filter 80 can be calculated in advance, or obtained from catalogue data.

The ECU 50 performs the combustion timing control shown in the flowchart of FIG. 4 by its combustion control section 51a while the instantaneous interruption does not occur. The ECU 50 also performs the process shown in the flowchart of FIG. 12 to determine occurrence of the instantaneous interruption, and switch between the combustion timing control and the saving operation in accordance with the determination result. The second embodiment differs from the first embodiment in the way to set the threshold B at step S23. In the second embodiment, the process calls a subroutine shown in FIG. 15 at step S23 to set the threshold B. Next, the subroutine shown in FIG. 15 is explained.

Figure 15:
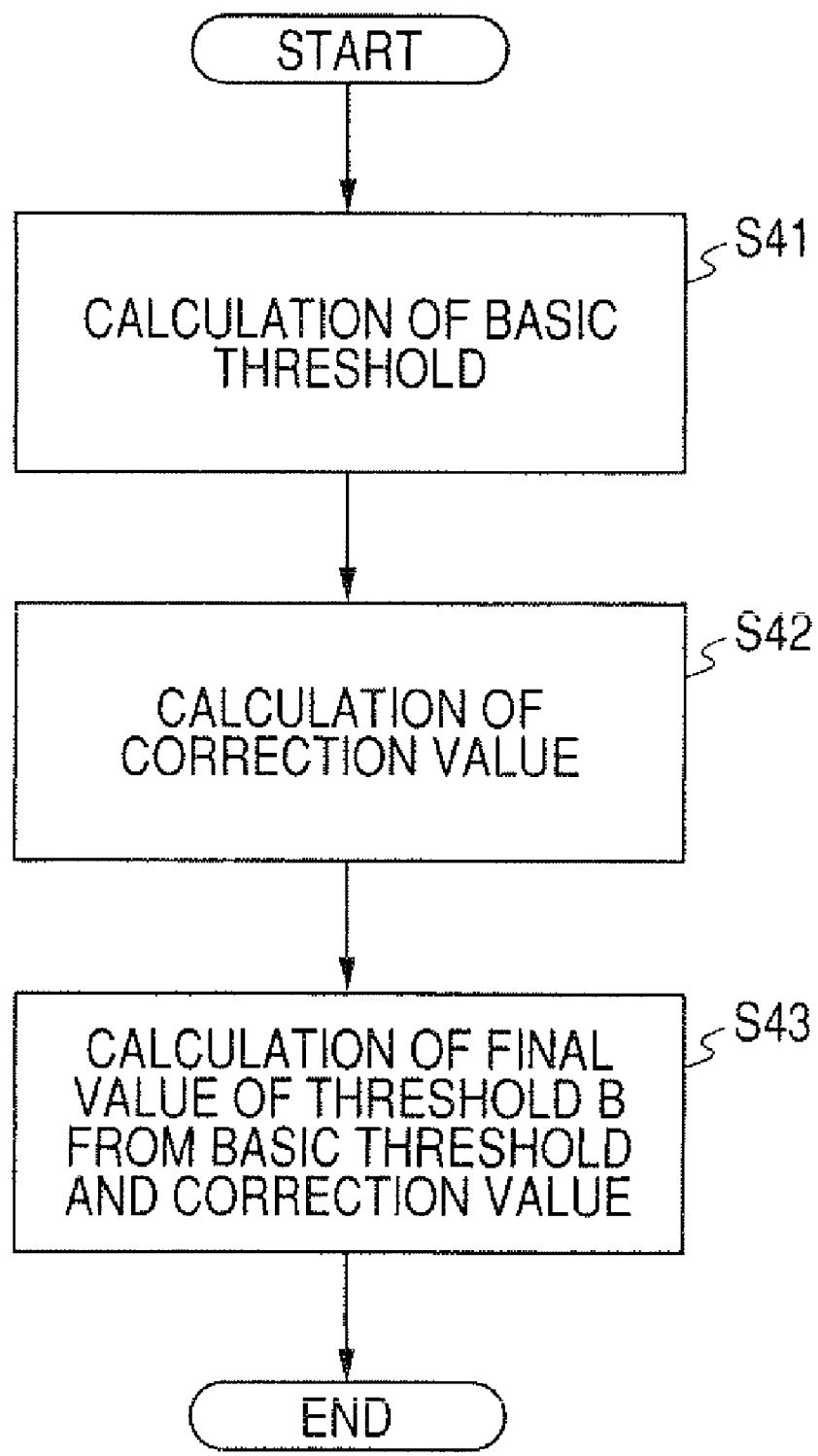
FIG. 15 is a flowchart showing the process for setting the threshold value B in the internal combustion engine control apparatus according to the second embodiment of the invention.

The subroutine shown in FIG. 15 begins by calculating at step S41 the value of the noise-removed in-cylinder pressure signal Pa multiplied by a predetermined first constant $\alpha$, as a basic threshold value $C \times \alpha$. At subsequent step S42, the reciprocal of the gain D stored in the ROM 53 multiplied by a predetermined second constant $\beta$ is calculated as a correction value D. At subsequent step S43, the value of the basic threshold value $C \times \alpha$ multiplied by the correction value $\beta/D$ is calculated as a final value of the threshold B. As the value C of the noise-removed in-cylinder pressure signal Pa which is a basis for calculating the derivative signal $dPa/d\theta$ increases, the basic threshold value $C \times \alpha$ increases, causing the final value of the threshold B to increase. On the other hand, as the gain D increases, the correction value $\beta/D$ decreases, causing the final value of the threshold B to decrease. The values of the constants $\alpha$ and $\beta$ are determined in advance such that the threshold B has an appropriate value (80% of the derivative signal $dPa/d\theta$, for example). After completion of step S43, the subroutine is terminated. The subroutine shown in FIG. 15 is performed for each value of the crank angle $\theta$, to calculate the threshold B for each value of the derivative signal $dPa/d\theta$.

Thereafter, as in the first embodiment, the one-cycle reached times COUNT [k] is counted for each of the engine cycles [k, k=1 to N], and it is determined whether or not the instantaneous interruption has occurred on the basis of the threshold reached times SUM of the current engine cycle [i] and a predetermined number (N in this embodiment) of the previous engine cycles (steps S21 to S28). If the instantaneous interruption is detected, the combustion timing control is halted, and the saving operation is executed (steps S29 to S31).

As explained above, according to the second embodiment, since the threshold value B is calculated for each value of the $dPa/d\theta$ depending on the value of the noise-removed in-cylinder pressure signal Pa and the gain D, it is possible to reliably detect the instantaneous interruption irrespective of the value of the noise-removed in-cylinder pressure signal Pa when the instantaneous interruption has occurred. The threshold B is calculated in real time based on the noise-removed in-cylinder pressure signal Pa which reflects the running state of the engine 10. That is, since the threshold B reflects the running state of the engine 10, it is possible to reliably detect the instantaneous interruption.

Further, since the threshold B is the sum of the basic threshold value $C \times \alpha$ which increases as the noise-removed in-cylinder pressure signal Pa increases, and the correction value $\beta/D$ which decreases as the gain D increases, it is easy to set the threshold B optimally taking account of the value of the noise-removed in-cylinder pressure signal Pa and the gain D.

It is a matter of course that various modifications can be made to the above embodiments as described below. In the first and second embodiments, the derivative signal $dPa/d\theta$ of the noise-removed in-cylinder pressure signal Pa is used to determine occurrence of the instantaneous interruption, however, other signals which are functions of the derivative signal $dPa/d\theta$ may be used. One of such signals is the heat generation rate $dQ/d\theta$ calculated in accordance with the foregoing equation (1). The heat generation rate $dQ/d\theta$ can be used for other purposes other than detecting the instantaneous interruption, such as determining the fuel injection timing.

In the first and second embodiments, determination of occurrence of the instantaneous interruption is made on the basis of the threshold reached times SUM of the current engine cycle [i] and the predetermined number of the immediately previous engine cycles. However, the determination may be made on the basis of the threshold reached times SUM of previous engine cycles during any past period. For example, the determination may be made on the basis of the threshold reached times SUM counted during a period of past one hour or past one day, or the period from the start of the engine 10 until the present time. The period to count the threshold reached times SUM and the predetermined number M as a threshold number of times to detect the instantaneous interruption may be set depending on the current environment or the running state. Because the magnitude and characteristic of the noise superimposed on the noise-removed in-cylinder pressure signal Pa depend on the current environment or the running state.

In the first and second embodiments, determination of occurrence of the instantaneous interruption is made on the basis of the threshold reached times SUM counted for the predetermined number of the previous engine cycles in order to prevent making an erroneous determination. However, when detecting the instantaneous interruption without fail is given a higher priority than preventing making an erroneous determination, the above embodiments may be modified to determine that the instantaneous interruption has occurred instantly when the derivative signal $dPa/d\theta$ has exceeded the threshold B.

In the second embodiment, the threshold B is calculated by adding the basic threshold value $C \times \alpha$ which increases as the noise-removed in-cylinder pressure signal Pa increases, and the correction value β/D which decreases as the gain D increases. This is for setting the threshold B such that it increases as the value of the noise-removed in-cylinder pressure signal Pa increases, and decreases as the gain D increases. Accordingly, the threshold B may be calculated in different ways if the threshold B can be set as above. For example, the threshold B may be calculated by multiplying the basic threshold value which increases as the noise-removed in-cylinder pressure signal Pa increases and the correction value which decreases as the gain D increases. In this case, the values of the first constant α to calculate the basic threshold value and the second constant β to calculate the correction value are respectively different from those in the case where the threshold B is calculated by adding the basic threshold value and the correction value.

The above explained preferred embodiments are exemplary of the invention of the present application which is described solely by the claims appended below. It should be understood that modifications of the preferred embodiments may be made as would occur to one of skill in the art.

What is claimed is:

1. An instantaneous interruption detection apparatus for an in-cylinder pressure sensor mounted on a cylinder of an internal combustion engine to output an in-cylinder pressure signal indicative of an in-cylinder pressure of the cylinder, the instantaneous interruption detection apparatus comprising:
    a noise removing section to remove a noise component from the in-cylinder pressure signal inputted thereto, and output a noise-removed in-cylinder pressure signal;
    a crank angle sensor to detect a crank angle of a crank shaft of the internal combustion engine;
    a derivative signal calculating section to calculate a detection signal which is a function of a derivative value of the noise-removed in-pressure signal with respect to the crank angle;
    an instantaneous interruption determining section configured to make determination that instantaneous interruption of the in-cylinder pressure signal transmitted from the in-cylinder pressure sensor has occurred when the detection signal has exceeded a detection threshold; and
    a threshold setting section configured to set the detection threshold to such a value that the instantaneous interruption determining section can make the determination in accordance with the noise-removed in-pressure signal which is dull compared to the in-cylinder pressure signal inputted to the noise removing section depending on a gain-frequency characteristic of the noise removing section.

2. The instantaneous interruption detection apparatus according to claim 1, wherein the threshold setting section includes:
    a map storing section which stores a threshold value as a function of the crank angle in the form of a threshold map, the threshold value being determined on the basis of difference between a derivative of a waveform of the noise-removed in-cylinder pressure signal for a case where the instantaneous interruption does not occur and a derivative of a waveform of the noise-removed in-cylinder pressure signal for a case where the instantaneous interruption occurs, the waveforms being obtained in advance by simulation; and
    a map reading section which reads the threshold value from the threshold map corresponding to a current value of the crank angle, and sets the read threshold value as a current value of the detection threshold.

3. The instantaneous interruption detection apparatus according to claim 2, wherein the simulation is carried out for each of different running states of the internal combustion engine, the map storing section storing the threshold value in the form of a plurality of threshold maps for each of the running states of the internal combustion engine, the map reading section being configured to select one of the plurality of the threshold maps, which corresponds to a current running state of the internal combustion engine.

4. The instantaneous interruption detection apparatus according to claim 3, wherein the running states of the internal combustion engine are defined by at least one of a rotational speed and a fuel injection amount of the internal combustion engine.

5. The instantaneous interruption detection apparatus according to claim 1, wherein the threshold setting section includes a characteristic storing section to store a gain-frequency characteristic of the noise removing section, and a threshold calculating section configured to calculate, with reference to a waveform of the noise-removed in-cylinder pressure signal and the gain-frequency characteristic, a value of the detection threshold as a function of the detection signal such that the value of the detection threshold increases as the noise-removed in-cylinder pressure signal increases, and decrease as a gain of the noise removing section increases.

6. The instantaneous interruption detection apparatus according to claim 5, wherein the threshold calculating section includes a basic threshold value calculating section to calculate a basic threshold value by multiplying the waveform of the noise-removed in-cylinder pressure signal by a predetermined first constant, a correction value calculating section to calculate a correction value by multiplying a reciprocal of the gain by a second predetermined constant, and an adding section to calculate the detection threshold as a function of the detection signal by adding the basic threshold value and the correction value.

7. The instantaneous interruption detection apparatus according to claim 1, further comprising a counting section to count the number of times that the detection signal has exceeded the detection threshold within a predetermined time period, the instantaneous interruption determining section being configured to determine that the instantaneous interruption has occurred when the number of times counted by the counting section has exceeded a predetermined number.

8. The instantaneous interruption detection apparatus according to claim 1, wherein the noise removing section is a filter circuit or a circuit configured to remove noise by smoothing or dulling a signal inputted thereto.

9. The instantaneous interruption detection apparatus according to claim 1, wherein the detection signal is a heat generation rate of the cylinder.

10. An internal combustion engine control apparatus comprising:
    an instantaneous interruption detection apparatus as recited in claim 9;
    a combustion timing control section to perform combustion timing control in which, when ignition timing is at a first crank rotation angle of a crank shaft of the internal combustion engine at which a heat generation rate of a cylinder of the internal combustion engine is at a first predetermined value, controls fuel injection timing such that the ignition timing is at a second crank rotation angle of the crank shaft at which the heat generation rate is at a second predetermined value; and a halting section to halt the combustion timing control by the combustion timing control section when the instantaneous interruption detection apparatus detects the instantaneous interruption.

11. The internal combustion engine control apparatus according to claim 10, further comprising a map storing section to store a plurality of maps each showing basic injection timing predetermined as an injection timing appropriate to a corresponding one of different running states of the internal combustion engine, and a saving operation executing section configured to perform, when the halting section halts the combustion timing control, a saving operation in which fuel is injected in accordance with the basic injection timing shown by one of the plurality of maps which correspond to a current running state of the internal combustion engine.

* * * * *